(12) United States Patent
Skokna et al.

(10) Patent No.: US 9,514,639 B2
(45) Date of Patent: Dec. 6, 2016

(54) UNIVERSAL REMOTE CONTROL USER INTERFACE FOR DISCRETE CONTROL OF MULTIPLE DEVICES

(71) Applicant: Ray Enterprises Inc., New York, NY (US)

(72) Inventors: David Skokna, Brooklyn, NY (US); Bernardo Ferreira de Carvalho e Silva, Brooklyn, NY (US); Mark Isaac Kizelshteyn, New York, NY (US); Daniel Cristiano Rocha, Sao Paulo (BR)

(73) Assignee: Ray Enterprises Inc., New York, NY (US)

( * ) Notice: Subject to any disclaimer, the term of this patent is extended or adjusted under 35 U.S.C. 154(b) by 0 days.

(21) Appl. No.: 14/744,293

(22) Filed: Jun. 19, 2015

(65) Prior Publication Data

US 2015/0371533 A1 Dec. 24, 2015

Related U.S. Application Data

(60) Provisional application No. 62/014,952, filed on Jun. 20, 2014.

(51) Int. Cl.
*G08C 17/02* (2006.01)
*G08C 23/04* (2006.01)
(Continued)

(52) U.S. Cl.
CPC ............. *G08C 17/02* (2013.01); *G08C 23/04* (2013.01); *H04N 5/4403* (2013.01); *H04N 5/44543* (2013.01); *H04N 21/25808* (2013.01); *H04N 21/25891* (2013.01); *H04N 21/42207* (2013.01); *H04N 21/42208* (2013.01); *H04N 21/42224* (2013.01); *H04N 21/42225* (2013.01); *H04N 21/42226* (2013.01); *H04N 21/4312* (2013.01); *H04N 21/4316* (2013.01);
(Continued)

(58) Field of Classification Search
CPC . G08C 17/02; G08C 2201/10; G08C 2201/20; G08C 2201/21; G08C 2201/30; G08C 2201/50; G08C 2201/92; G08C 23/04; H04N 2005/443; H04N 2005/44556; H04N 21/25891; H04N 21/42207; H04N 21/42208
See application file for complete search history.

(56) References Cited

U.S. PATENT DOCUMENTS 6,597,374 B1   7/2003   Baker et al.
8,134,650 B2   3/2012   Maxson et al.
(Continued)

*Primary Examiner* — Hirdepal Singh
(74) *Attorney, Agent, or Firm* — Rankin, Hill & Clark LLP

(57) ABSTRACT

A universal remote control device and methods for controlling multiple devices with a universal remote control device are provided. The method includes receiving a boot completed notification from a control unit of the universal remote control device and displaying a troubleshooting icon on a display of the universal remote control device. Upon receiving a user input selecting the troubleshooting icon, the method includes generating a power user interface menu enabling discrete control of power for each device controlled by the universal remote control device. The power user interface menu is displayed on a least a portion of the display of the universal remote control device.

18 Claims, 6 Drawing Sheets

(51) Int. Cl.
*H04N 21/433* (2011.01)
*H04N 21/45* (2011.01)
*H04N 5/44* (2011.01)
*H04N 5/445* (2011.01)
*H04N 21/258* (2011.01)
*H04N 21/431* (2011.01)
*H04N 21/482* (2011.01)
*H04N 21/422* (2011.01)
*H04N 21/81* (2011.01)
*H04N 21/458* (2011.01)
*H04N 21/475* (2011.01)

(52) U.S. Cl.
CPC ..... *H04N 21/4331* (2013.01); *H04N 21/4532* (2013.01); *H04N 21/4586* (2013.01); *H04N 21/475* (2013.01); *H04N 21/4821* (2013.01); *H04N 21/4826* (2013.01); *H04N 21/8186* (2013.01); *G08C 2201/10* (2013.01); *G08C 2201/20* (2013.01); *G08C 2201/21* (2013.01); *G08C 2201/30* (2013.01); *G08C 2201/50* (2013.01); *G08C 2201/92* (2013.01); *H04N 2005/443* (2013.01); *H04N 2005/44556* (2013.01)

(56) References Cited

U.S. PATENT DOCUMENTS

| | | | |
|---|---|---|---|
| 8,176,432 B2 | 5/2012 | Klein et al. | |
| 8,922,616 B2 | 12/2014 | Mock | |
| 2001/0017615 A1* | 8/2001 | Lin | G08C 19/28 345/173 |
| 2004/0257259 A1 | 12/2004 | Jindal | |
| 2008/0180306 A1* | 7/2008 | McRae | G06F 3/01 341/176 |
| 2009/0085764 A1* | 4/2009 | Jee | G08C 23/04 340/4.31 |
| 2011/0085083 A1* | 4/2011 | Friedlander | H04N 5/4403 348/563 |
| 2011/0298581 A1* | 12/2011 | Hsu | H04N 21/42225 340/4.3 |
| 2012/0044061 A1* | 2/2012 | Sakai | G08C 17/00 340/12.5 |
| 2012/0274863 A1 | 11/2012 | Chardon et al. | |
| 2013/0099954 A1* | 4/2013 | Belz | G06F 3/0238 341/176 |
| 2014/0153927 A1* | 6/2014 | Langer | G08C 17/02 398/106 |
| 2014/0253301 A1* | 9/2014 | Hirayama | G08C 23/04 340/12.54 |
| 2016/0203705 A1* | 7/2016 | Hawkins | G08C 23/04 340/12.54 |

\* cited by examiner

UNIVERSAL REMOTE CONTROL USER INTERFACE FOR DISCRETE CONTROL OF MULTIPLE DEVICES

CROSS-REFERENCE TO RELATED APPLICATION

This application claims the benefit of U.S. Provisional Patent Applicant No. 62/014,952 having the title UNIVERSAL REMOTE CONTROL and filed on Jun. 20, 2014, the disclosure of which is incorporated herein by reference.

BACKGROUND

This disclosure is related to providing a user interface on a display of a universal remote control device to enable discrete control (e.g., power ON, power OFF) of multiple devices controlled by the universal remote control device. Generally, a universal remote control device is an electronic device that can remotely control the operation of one or more different devices. These different devices can include, for example, televisions, set top boxes, smart set top boxes, gaming consoles, audio systems, among others.

When multiple devices are controlled by a universal remote control device, multiple command signals can be transmitted from the universal remote control device to the multiple devices. For example, when a power toggle on the universal remote control device is activated, power command signals can be transmitted from the universal remote control device to the multiple devices. The power command signals can change the power status (ON/OFF) of the devices to the alternate power status (ON/OFF). Accordingly, unless the universal remote control device knows an initial power status of the multiple devices, the universal remote control device may not know whether power command signals turns the multiple devices ON or OFF. Further, the universal remote control device may not know whether the devices were controlled properly (e.g., turned ON or OFF) after power command signals are transmitted to the multiple devices. Accordingly, a user of the universal remote control device may have to configure and/or troubleshoot the devices separately, for example, with a separate remote for each device, a separate interface for each device, or physical buttons on each device itself.

BRIEF DESCRIPTION

In view of the foregoing, a computer-implemented method for controlling multiple devices with a universal remote control device is provided. The method includes receiving a boot completed notification from a control unit of the universal remote control device and displaying a troubleshooting icon on a display of the universal remote control device. Upon receiving a user input selecting the troubleshooting icon, the method includes generating a power user interface menu enabling discrete control of power for each device controlled by the universal remote control device. Further, the method includes displaying the power user interface menu on a least a portion of the display.

According to a further aspect, a universal remote control device for controlling multiple devices is provided. The universal remote control device includes a control unit electrically connected with a power switch, the control unit initiating a boot process and generating a boot completed notification based on actuation of the power switch, the control unit including a processor. The universal remote control device includes a display electrically connected with the control unit, the display including a touch panel for receiving user input. The control unit displays a troubleshooting icon on the display upon generating the boot completed notification. Upon receiving a user a user input on the touch panel selecting the troubleshooting icon, the control unit generates a power user interface menu enabling discrete control of power for each device controlled by the universal remote control device from the power user interface menu. The control unit displays the power user interface menu on a least a portion of the display.

According to another aspect a non-transitory computer readable medium comprising instructions that when executed by a processor electrically connected to a control unit of a universal remote control device performs a method for controlling a multiple devices is provided. The method includes receiving a boot completed notification from a control unit of the universal remote control device and displaying a troubleshooting icon on a display of the universal remote control device. Upon receiving a user input selecting the troubleshooting icon, the method includes generating a power user interface menu enabling discrete control of power for each device controlled by the universal remote control device. The method further includes displaying the power user interface menu on a least a portion of the display.

DETAILED DESCRIPTION

The following includes definitions of selected terms employed herein. The definitions include various examples and/or forms of components that fall within the scope of a term and that can be used for implementation. The examples are not intended to be limiting.

"Computer communication," as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "database," as used herein can refer to table, a set of tables, a set of data stores (e.g., disks, memory) and/or methods for accessing and/or manipulating those data stores.

A "memory," as used herein, can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

An "operable connection," or a connection by which entities are "operably connected," is one in which signals, physical communications, and/or logical communications can be sent and/or received. An operable connection can include a wireless interface, a physical interface, a data interface, and/or an electrical interface.

A "processor," as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

Figure 1:
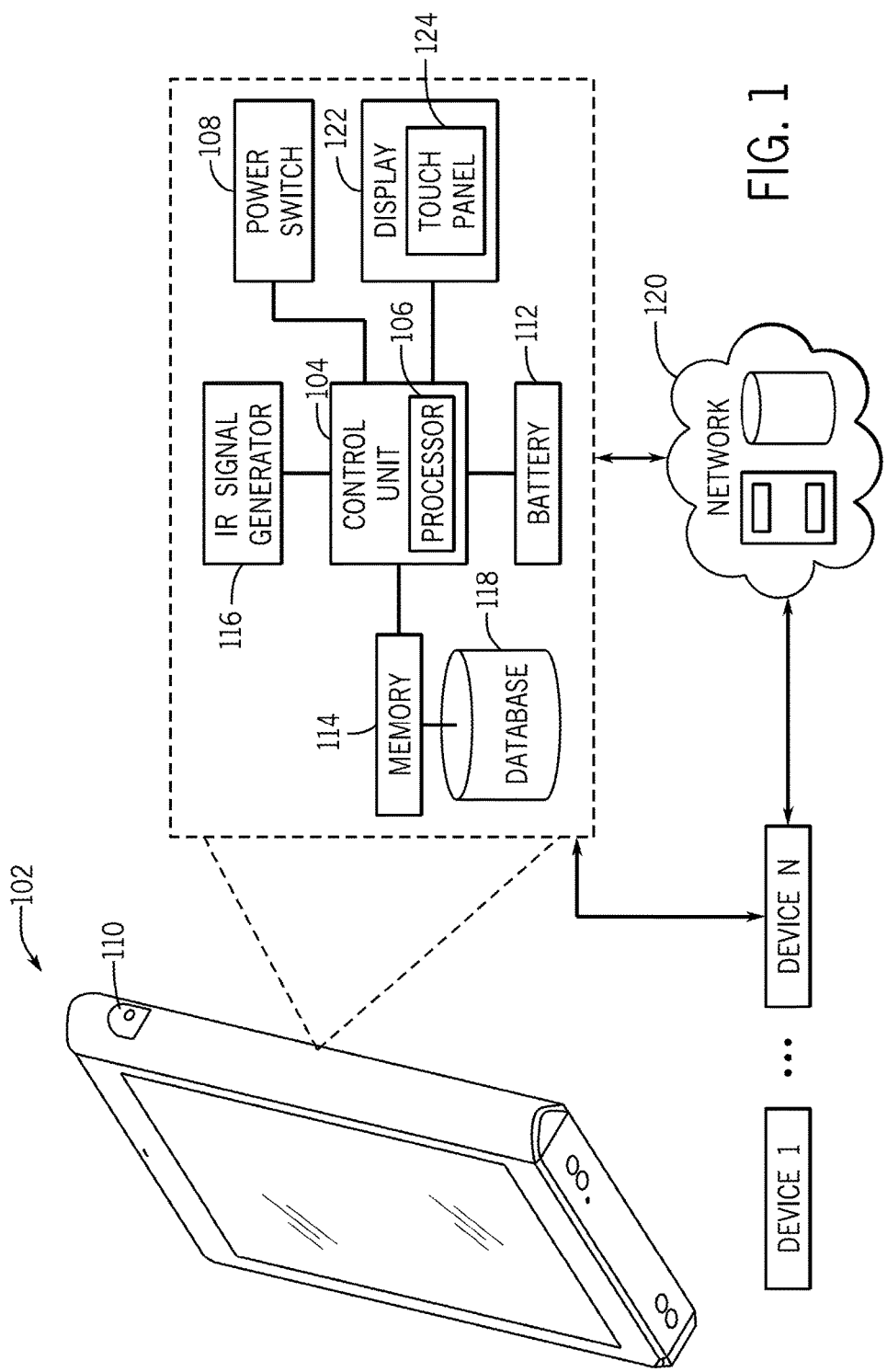
FIG. 1 is a schematic view of a universal remote control device including electrical components and an operating environment for providing a user interface for discrete control of multiple devices.

Referring now to the drawings, wherein the showings are for purposes of illustrating one or more exemplary embodiments and not for purposes of limiting same, FIG. 1 is a schematic view of a universal remote control device including electrical components and an operating environment for providing a user interface for discrete control of multiple devices. It is understood that the components shown in FIG. 1, as well as the components of other systems, hardware architectures, and software architectures discussed herein, can be combined, omitted, or organized into different architectures for various embodiments. In the embodiment shown in FIG. 1, an operating environment 100 for providing a user interface for discrete control of multiple devices includes a universal remote control device 102. The universal remote control device 102 is configured to be operated by a user (not shown) to remotely control a device (e.g., a machine) by sending wireless signals from the universal remote control device 102 to the device. The universal remote control device 102 can remotely control multiple devices connected to the universal remote control device 102. For example, in FIG. 1, the universal remote control device 102 can be operably connected for computer communication to remotely control devices 1 . . . n. Exemplary devices can include, but are not limited to, a television, set top box, smart set top box, gaming consoles, audio systems, among others.

The electrical components of the universal remote control device 102 will now be described in detail. It is understood that the universal remote control device 102 can include other components, software, and/or firmware not shown in FIG. 1. The universal remote control device 102 includes a control unit 104, the control unit 104 including a processor 106. The control unit 104 generally directs the operation of the processor 106 and manages other components of the universal remote control device 102. The control unit 104 is electrically connected (e.g., operably connected for computer communication) to a power switch 108. The power switch 108 is actuated by a user pressing a power button 110. As shown in FIG. 1, the power button 110 can be a physical button located on the housing of the universal remote control device 102. Accordingly, upon actuation of the power switch 108, the control unit 104 initiates a boot process and the control unit 104 generates and/or receives a boot completion notification after the boot process is completed. The boot process causes the universal remote control device 102 and the components therein to be configured and prepared to execute instructions and application programs (e.g., loads the operating system, initializes memory and other components). In particular the boot process is completed after the universal remote control device 102 is powered via the battery 112 electrically connected to the control unit 104, instructions are loaded, from, for example, a memory 114, and, in some embodiments a graphical user interface is displayed, which will be described in more detail herein.

Additionally, the control unit 104 can operate an infrared (IR) signal generator 116 electrically connected to the control unit 104 to control the multiple devices connected to the universal remote control device 102 (e.g., transmit function and/or control signals to the multiple devices for control). More specifically, upon actuation of the power switch 108, the IR signal generator 116 can transmit power (ON/OFF) signals (e.g., power codes) to the devices (e.g., devices 1 . . . n) controlled by the universal remote control device 102. In one embodiment, upon actuation of the power switch 108, the control unit 104 instructs (e.g., transmits a command) the IR signal generator 116 to transmit power (ON/OFF) signals to all devices controlled by the universal remote control device 102. The power (ON/OFF) signals changes the power status (ON/OFF) of the devices to the alternate power status (ON/OFF).

Information about the devices controlled by the universal remote control device 102 can be stored and/or preloaded in the memory 114. For example, the memory 114 can include a database 118 including information about the devices (e.g., device ID, type of device, power ON code, power OFF code, other function codes) for controlling the devices from the universal remote control device 102. It is understood that the universal remote control device 102 can be configured for wireless connectivity via Wi-Fi, Bluetooth, ZigBee and Z-Wave. The universal remote control device 102 can be operably connected for computer communication using said wireless technologies to a network 120 and the devices 1 . . . n. The network 120 is, for example, a data network, the Internet, a wide area network or a local area network. The network 120 serves as a communication medium to various remote devices (e.g., databases, web servers, remote servers, application servers, intermediary servers, client machines, other portable devices), and in some embodiments, a communication medium to the devices 1 . . . n.

The control unit 104 also includes a display 122 electrically connected to the control unit 104. The display 122 can include a touch panel 124 for receiving user input. The display 122 can present a user interface (e.g., a graphical user interface) to the user and the display 122 thereby allows the user to interact with the universal remote control device 102. In one embodiment, upon generating the boot completed notification, the control unit generates and displays a graphical user interface (GUI). For example, in one embodiment, a GUI, for example, a "home screen" is displayed with a navigation bar. The navigation bar can include various icons including a troubleshooting icon.

Figure 2:
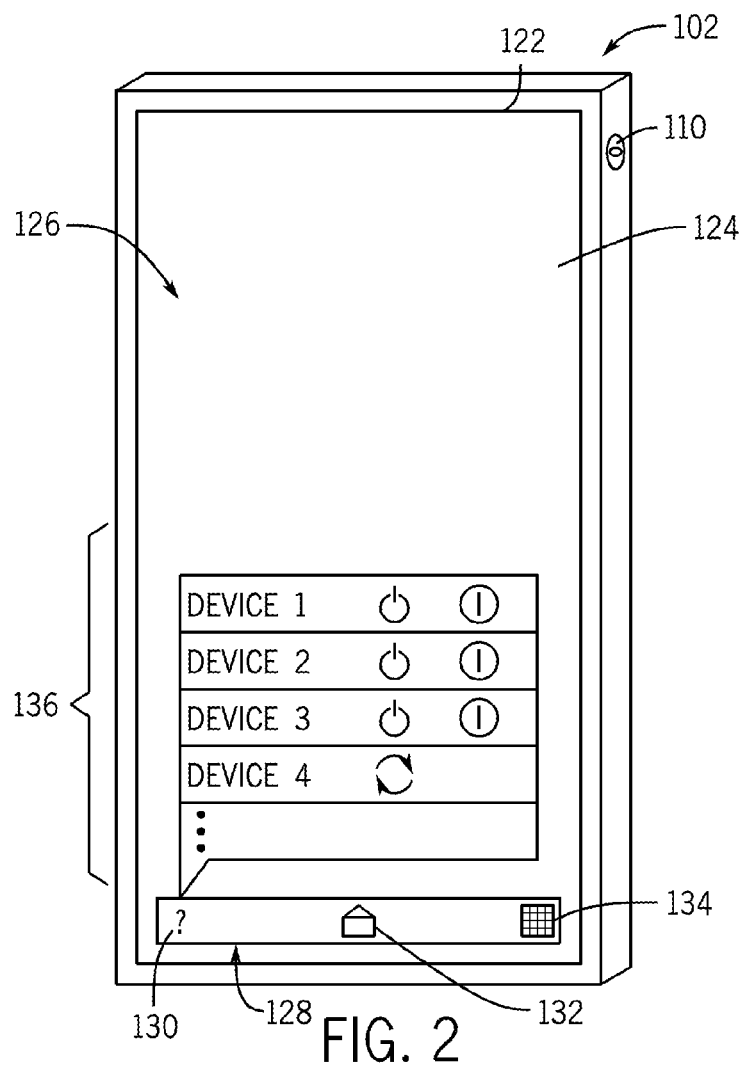
FIG. 2 is a schematic view of the universal remote control device of FIG. 1 including a power user interface menu provided on a portion of the display of the universal remote control device.

Referring now to FIG. 2, a schematic view of the universal remote control device of FIG. 1 including a power user interface menu provided on a portion of the display of the universal remote control device is shown. For simplicity, like numerals in FIGS. 1 and 2 refer to like components. In FIG. 2, the display 122, including the touch panel 124, can present a user interface (e.g., GUI) to display information and allow interaction and control between a user and the universal remote control device 102. The user interface in FIG. 2 is generally indicated by element 126. Here, the user interface 126 includes a navigation bar 128 that is generated in a fixed and static position on the display 122. Although the navigation bar 128 is shown at the bottom of the display 122, it is understood that the navigation bar 128 can be located in other areas, positions, and displayed in different configurations. The navigation bar 128 is accessible from any application and/or user interface (e.g., user interface 126 and other user interfaces generated and displayed on the display 122) displayed on the universal remote control device 102.

The navigation bar 128 can include different icons (and/or other graphic and text representations), the icons associated with different functions. As mentioned above, upon generating and/or receiving the boot completed notification, the control unit 104 controls the display 122 to display a troubleshooting icon 130. Additionally, other icons can be presented on the navigation bar 128, for example, a home icon 132 and a remote interface icon 134. If the user selects the home icon 132, the control unit 104 controls the display 122 to present a home screen user interface (e.g., the user interface 126). If the user selects a remote interface icon 134, the control unit 104 controls the display 122 to present an interface of a remote (not shown) associated with, for example, a particular device controlled by the universal remote control device 102. It is understood that other icons and functions can be presented and actuated via the navigation bar 128.

In one embodiment, upon receiving a user input (e.g., a touch selection) on the touch panel 124 selecting the troubleshooting icon 130, the control unit 104 generates a power user interface menu. The power user interface menu provides a user interface for discrete control of power of each device controlled by the universal remote control device. As discussed above, after actuation of the power switch 108 and transmission of a power command signals to the devices (e.g., devices 1 . . . n), the universal remote control device 102, without user feedback, may not know whether the power command signals turns the devices ON or OFF. In another example, after actuation of the power switch 108 and transmission of a power command signals to the devices, the universal remote control device 102, without user feedback, may not know whether the devices were properly controlled (e.g., turned ON and/or OFF). Accordingly, the power user interface menu allows the user to control the discrete power status of the multiple connected devices controlled by the universal remote control device 102 in a single user interface.

In FIG. 2, the power user interface menu is generally shown by element number 136. The control unit 104 generates a power user interface menu 136 enabling discrete control of power for each device (e.g., devices 1 . . . n) controlled by the universal remote control device 102. As shown in FIG. 2, the control unit 104 generates and displays the power interface menu 136 on at least a portion of the display 122. For example, the power interface menu 136 can be overlaid on top of the user interface 126 currently displayed on the display 122. Accordingly, the power interface menu 136 can be accessed and displayed within any application and/or user interface displayed on the universal remote control device 102. The generation and function of the power interface menu 136 will now be described in detail.

Figure 3:
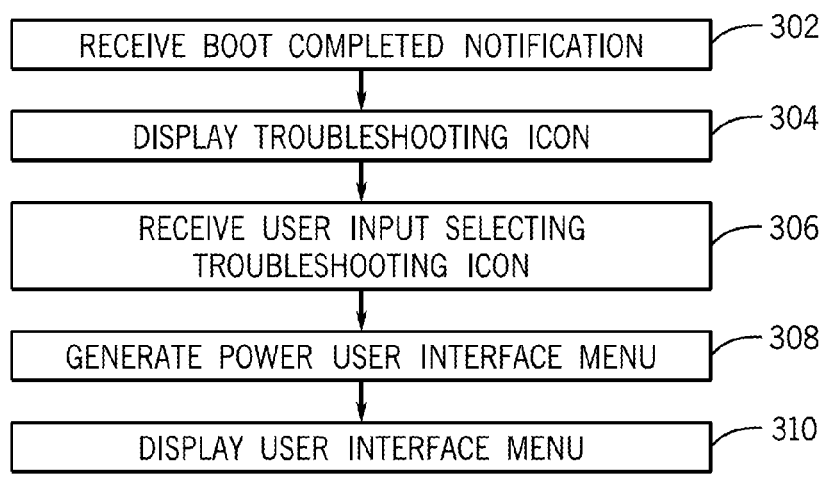
FIG. 3 is a process flow diagram of a method for controlling multiple devices with a universal remote control device by providing a user interface for discrete control of the multiple devices.

Referring now to FIG. 3, a process flow diagram of a method for controlling multiple devices with a universal remote control device by providing a user interface for discrete control of the multiple devices is shown. FIG. 3 will be described with reference to the systems and components of FIGS. 1 and 2. At block 302, the method includes receiving a boot completed notification from a control unit of the universal remote control device. As discussed above, upon actuation of the power switch 108, the control unit 104 initiates a boot process and the control unit 104 generates and/or receives a boot completion notification after the boot process is completed. In some embodiments, upon actuation of the power switch 108, the control unit 104 instructs (e.g., transmits a control signal) the IR signal generator 116 to transmit power command signals to all devices controlled by the universal remote control device 102.

At block 304, the method includes displaying a troubleshooting icon on a display of the universal remote control device. It is appreciated that in some embodiments, the troubleshooting icon can be a graphic or text representation. Thus, upon generating the boot completed notification, the control unit 104 generates and displays a troubleshooting icon on the display 122. Said differently, the troubleshooting icon is displayed after the universal remote control device 102 is powered on and/or activated for use. FIG. 2 illustrates an exemplary a troubleshooting icon 130 as part of a navigation bar 128 on the display 122.

Referring again to FIG. 3, at block 306, the method includes receiving a user input selecting the troubleshooting icon. For example, and referring again to FIG. 2, a user can touch the troubleshooting icon 130 via the touch panel 122 of the display 122. This touch selection transmits a signal to the control unit 104. Upon receiving the user input selecting the troubleshooting icon, the method proceeds to block 308.

At block 308, the method includes generating a power user interface menu enabling discrete control of power for each device controlled by the universal remote control device. Further, at block 310, the method includes displaying the power user interface menu on at least a portion of the display. FIG. 2 illustrates the power user interface menu as element 136. The power user interface menu 136 displays each device connected to the universal remote control device 102 and discrete icons associated with discrete codes (e.g., power ON, power OFF, wake-up) for each device.

Figure 4:
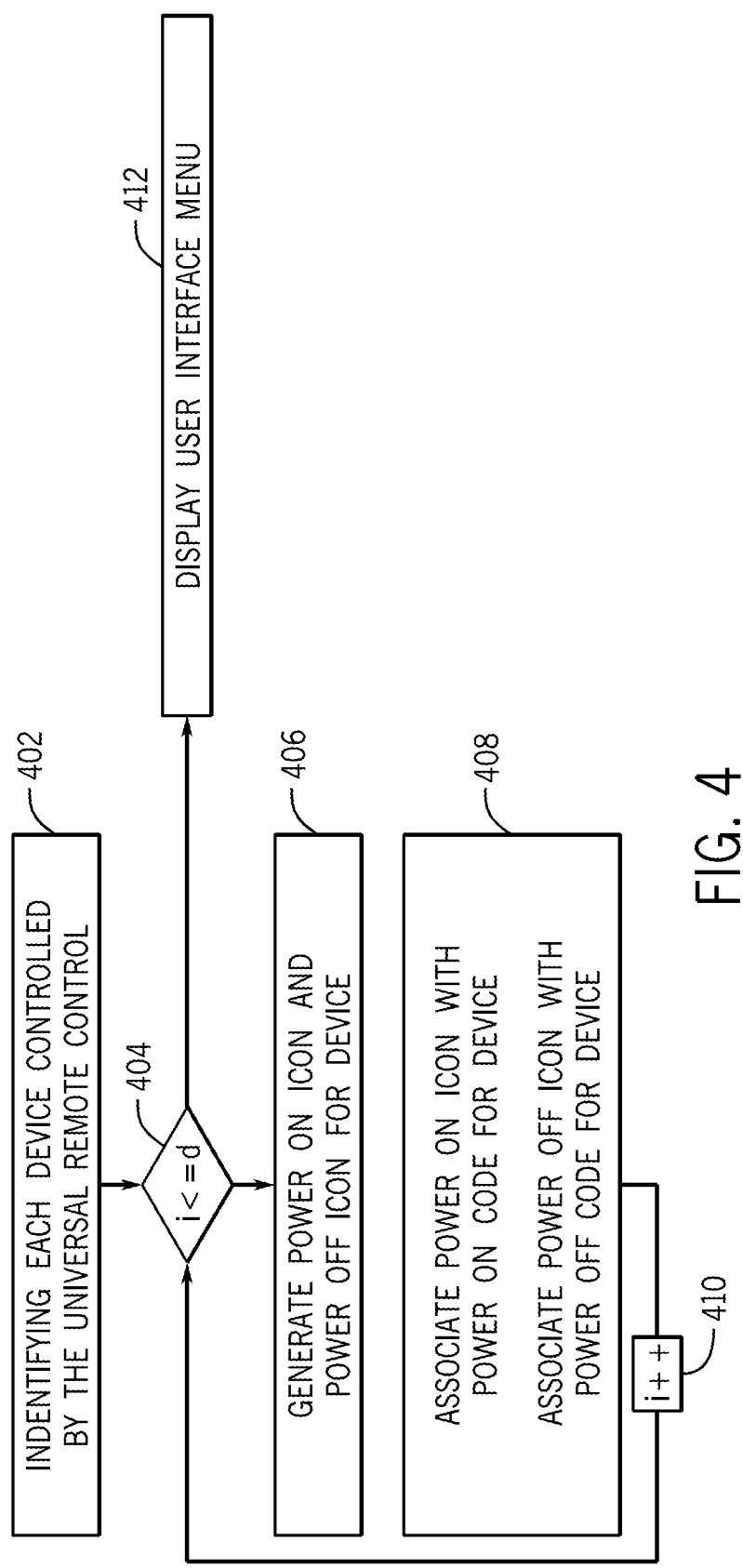
FIG. 4 is a process flow diagram of a method for generating a power user interface menu for discrete control of multiple devices.

Generation of the power user interface menu 136 will now be described in more detail. FIG. 4 illustrates a process flow diagram of a method for generating a power user interface menu for discrete control of multiple devices. At block 402, the method includes identifying each device controlled by the universal remote control device. Accordingly, at block 402, the method can include querying the database 118 (and/or memory 114) to determine and/or identify each device controlled by the universal remote control device 102. The control unit 104 can transmit this query to the database 118. The database 118 executes the query, and transmits to the control unit 104 a response including the identified devices (e.g., device IDs) and a number of identified devices, represented as counter d. The counter d can be initialized and stored, for example, at the memory 114. Additionally, the control unit 104 can also initialize and store (e.g., at the memory 114) a counter i.

Thus, the method further includes generating a power ON icon and a power OFF icon for each identified device. Accordingly, at block 404 it is determined if counter i is less than or equal to counter d. If yes, at block 406, the method further includes generating a power ON icon and a power OFF icon for the device d. It is appreciated that the icon could be a graphical or text representation.

Further, for each identified device, the power ON icon is associated with a power ON code and the power OFF icon is associated with a power OFF code. Each power ON code and power OFF code is specific to each device (e.g., discrete power ON and power OFF codes for each device). Thus, at block 408, the method includes associating the power ON icon with a power ON code for the device d and associating the power OFF icon with a power OFF code for the device d. The power ON code and power OFF code can be IR codes (e.g., signal codes) stored in the database 118 specific to each device d. Thus, at block 408, the control unit 104 can query the database 118 for the power ON code and the power OFF code specific to the device d. Table 1, shown below, is an exemplary table of devices (e.g., stored in the database 118) controlled by the universal remote control device 102. These devices and device information (e.g., ID, type of device, function codes) can be pre-loaded through an onboarding process during setup of the universal remote control 102.

TABLE 1

| Device ID | Type of Device | Power ON code | Power OFF code | Other Function Codes |
|---|---|---|---|---|
| 0001 | TV | 22 | 23 | |
| 0002 | Audio | 55 | 56 | |
| 0003 | Gaming Console | 10 | 15 | |
| 0004 | Smart Top Box | | | 55 |
| . . . n | | | | |

After the power ON icon and power OFF icon are associated with the respective power ON and power OFF codes for the device d, the control unit at block 410, increments the counter i. The process shown in FIG. 4 occurs for each device and at block 412 (e.g., similar to block 310 of FIG. 3), the power user interface menu is displayed.

Referring again to FIG. 2, the power user interface menu 136 includes a list of devices generated by the control unit 104 (e.g., Device 1, Device 2, Device 3, Device 4). As can be seen for Device 1, Device 2, and Device 3, a power ON icon and power OFF icon are generated and displayed for each device. Each power ON icon and power OFF icon, as described above with the method of FIG. 4, is associated with a respective power ON code and power OFF code for the specific device. Accordingly, the user has discrete control of each connected device via the power user interface menu 136. As an illustrative example, upon receiving a user input (e.g., touch input) selecting the power ON icon for Device 1, the IR signal generator 116 transmits the power ON code (e.g., a power ON signal) associated with the power ON icon to Device 1.

Figure 5:
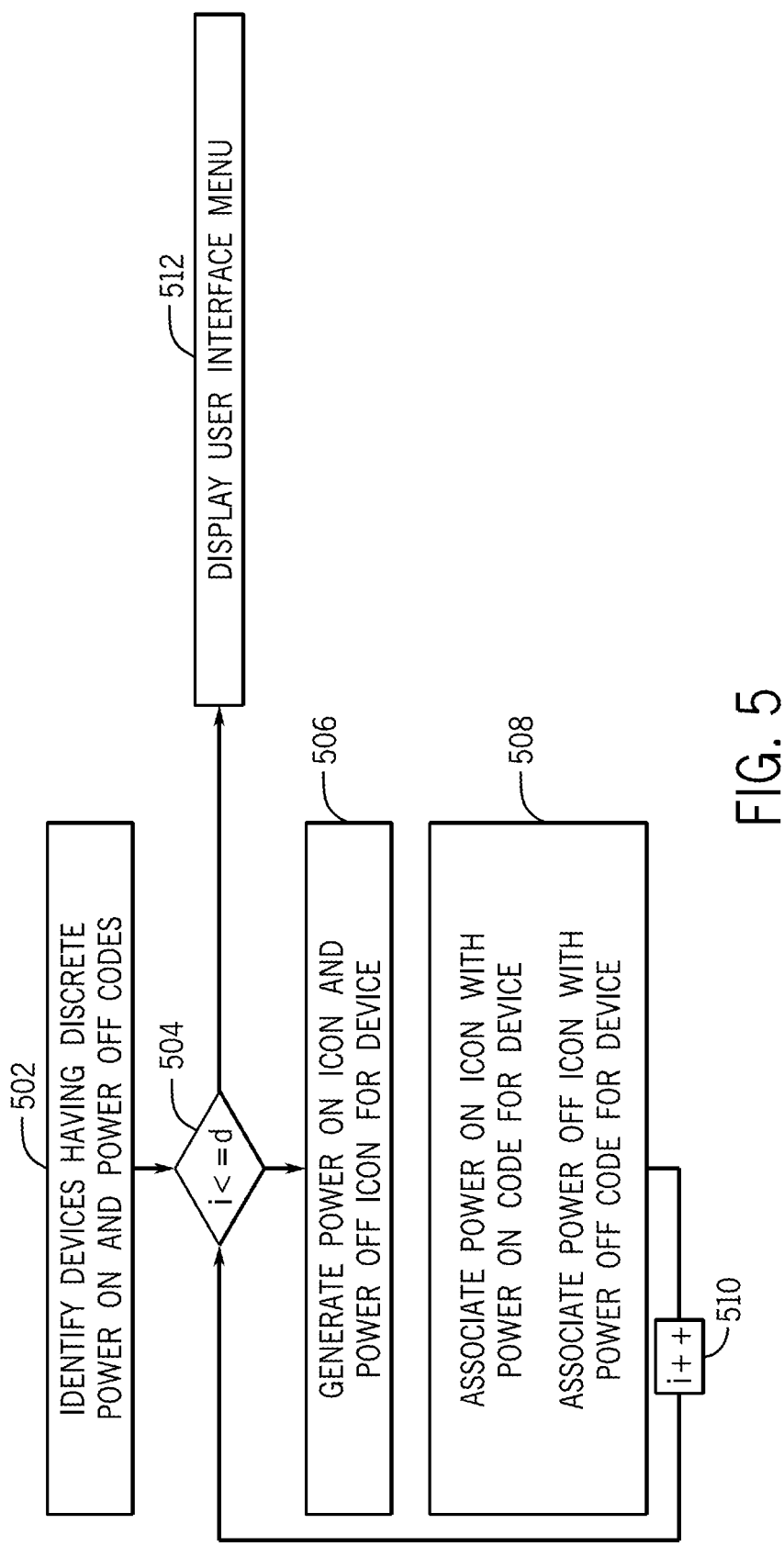
FIG. 5 is a process flow diagram of a method for identifying devices with discrete power ON and power OFF codes for generating a power user interface menu for discrete control of multiple devices.

Referring now to FIG. 5, another method for generating a power user interface menu will be described. FIG. 5 illustrates a process flow diagram of a method for identifying devices with discrete power ON and power OFF codes for generating a power user interface menu for discrete control of multiple devices. FIG. 5 will be described with reference to FIGS. 1 and 2. The method includes at block 502 identifying devices having discrete power ON and power OFF codes. Discrete codes perform only one function and are specific to the device. Thus, a discrete power ON code signal changes the power status of the device, specific to the discrete power ON code, to ON. A discrete power OFF code signal changes the power status of the device, specific to the discrete power OFF code, to OFF. This is opposed to a generic power command signal that changes the power status of a device to the alternate power status.

To identify devices having discrete power ON and power OFF codes, the control unit 104 can query the database 118 to determine which devices have discrete power ON and power OFF codes. The control unit 104 can transmit this query to the database 118, the database 118 executes the query and returns to the control unit 104, the identified devices (e.g., device ID) and a number of devices, represented as counter d. The counter d can be initialized and stored, for example, at the memory 114. Additionally, the control unit 104 can also initialize and store (e.g., at the memory 114) a counter i. Accordingly, at block 504, it is determined if counter i is less than or equal to counter d. If yes, at block 506, the method further includes generating a power ON icon and a power OFF icon for the device d. It is appreciated that the icon could be a graphical or text representation.

Further, for each device identified as having discrete power ON and power OFF codes, the power ON icon is associated with a power ON code and the power OFF icon is associated with a power OFF code. Each power ON code and power OFF code is specific to each device. Thus, at block 508, the method includes associating the power ON icon with a power ON code for the device d and associating the power OFF icon with a power OFF code for the device d. As discussed above, the power ON code and power OFF code can be IR codes (e.g., signal codes) stored in the database 118 specific to each device d. Thus, at block 508, the control unit 104 can query the database 118 for the power ON code and the power OFF code specific to the device d.

After the power ON icon and power OFF icon have been associated with the respective power ON and power OFF codes for the device d, the control unit at block 510, increments the counter i. The process shown in FIG. 5 occurs for each device and at block 512 (e.g., similar to block 310 of FIG. 3) the power user interface menu is displayed.

Figure 6:
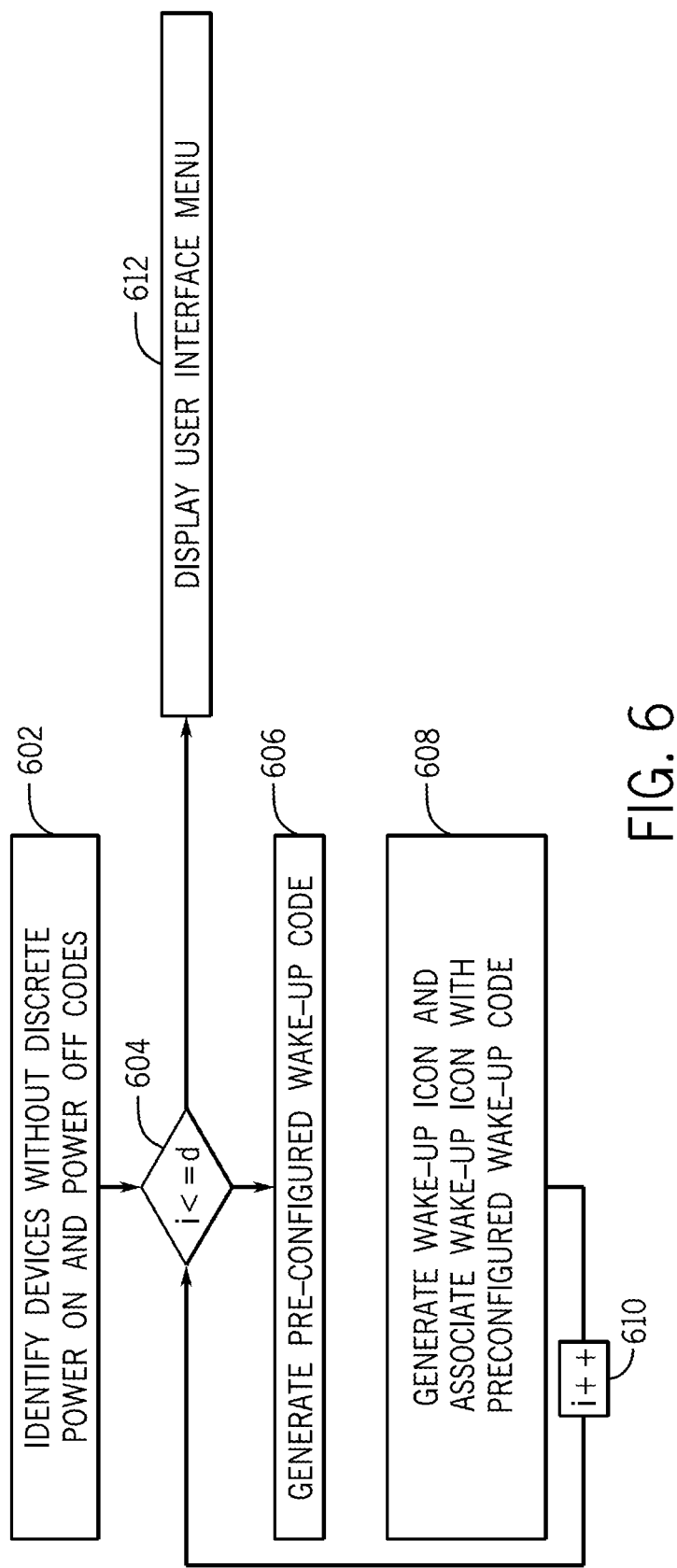
FIG. 6 is a process flow diagram of a method for identifying devices without discrete power ON and power OFF codes for generating a power user interface menu for discrete control of multiple devices.

Referring now to FIG. 6, another method for generating a power user interface menu will be described. FIG. 6 illustrates a process flow diagram of a method for identifying devices without discrete power ON and power OFF codes for generating a power user interface menu for discrete control of multiple devices. It is understood that in some embodiments, the methods of FIGS. 5 and 6 could be combined. FIG. 6 will be described with reference to FIGS. 1 and 2. At block 602, the method includes identifying devices without discrete power ON and power OFF codes. To identify devices without discrete power ON and power OFF codes, the control unit 104 can query the database 118 to determine which devices do not have discrete power ON and power OFF codes. The control unit 104 can transmit this query to the database 118, the database 118 executes the query and returns to the control unit 104, the identified devices (e.g., device ID) and a number of devices, represented as counter d. The counter d can be initialized and stored, for example, at the memory 114. Additionally, the control unit 104 can also initialize and store (e.g., at the memory 114) a counter i. Accordingly, at block 604, it is determined if counter i is less than or equal to counter d.

If yes, at block 606, the method further includes generating a pre-configured wake-up code for the device d. In some embodiments, the pre-configured wake-up code for the device d can be stored and retrieved from the database 118. The pre-configured wake-up code can be IR codes (e.g., signal codes) that are transmitted as a wake-up signal by the IR generator to the specific device d. At block 608, the method includes generating a generating a wake-up icon and associating the respective pre-configured wake-up code with each wake-up icon. The control unit at block 610, increments the counter i. The process shown in FIG. 6 occurs for each device and at block 612 (e.g., similar to block 310 of FIG. 3) the power user interface menu is displayed.

Referring again to FIG. 2, the power user interface menu 136 includes, in part, Device 4, with a wake-up icon (e.g., a sync icon). The wake-up icon, as described above, is associated with a pre-configured wake-up code specific to Device 4. Accordingly, the user has discrete control of each connected device via the power user interface menu 136. As an illustrative example, upon receiving a user input (e.g., touch input) selecting the sync icon for Device 4, the IR signal generator 116 transmits the pre-configured wake-up code (e.g., as a wake-up signal) associated with the sync icon to Device 4. This code when executed at the Device 4 wakes-up (e.g., initializes the device) and can initialize a data sync between the Device 4 an the universal remote control device 102.

Figure 7:
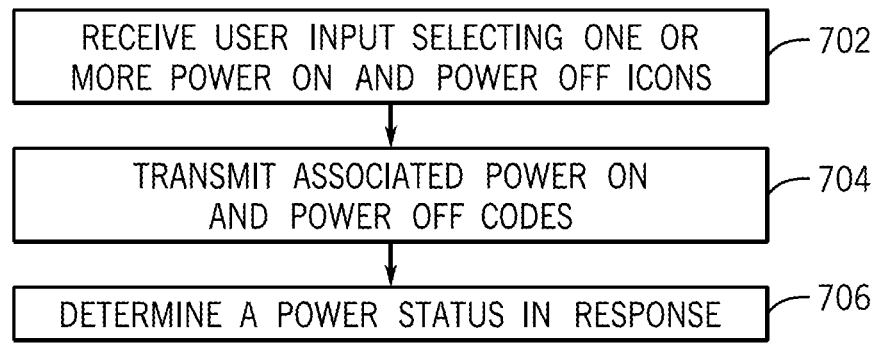
FIG. 7 is a process flow diagram showing a method of transmitting power ON and power OFF codes to multiple devices from the universal remote control device via a power user interface menu and determining a status of the multiple devices.

By enabling the user to discretely control the power status of each connected device, the universal remote control device 102 can, in some embodiments, determine the state (e.g., power status) of the device. Referring now to FIG. 7, a method of transmitting power ON and power OFF codes to multiple devices from the universal remote control device via a power user interface menu and determining a state of the multiple devices is shown. At block 702, the method includes receiving user input selecting one or more power ON and power OFF icons. As discussed above, the control unit 104 can receive a user input (e.g., touch input) selecting an icon generated and displayed on the power user interface menu 136. The power ON icon is associated with a discrete power ON code (e.g., power ON command signal) and the power OFF icon is associated with a discrete power OFF code (e.g., power OFF command signal).

Accordingly, at block 704, the method includes transmitting the power ON and power OFF code associated with the icon selected from the IR generator 116 to the specific device. Based on the transmitted code, at block 706, the method can include determining a power status of the device in response to transmitting the power ON and power OFF codes. For example, if a power ON code is transmitted to Device 1, the control unit 104 can determine the power status of Device 1 as ON. The control unit 104 can store this information (e.g., the power status) in the database 118.

In another embodiment, the method can include determining a current power status of the device in response to transmitting the power ON and power OFF codes and a previously stored power status of the device. The previously stored power status of the device can be stored, for example, in the database 118. Thus, the method can include comparing the power command (e.g., ON or OFF) transmitted to a device to the previously stored power status of the device to determine a current power status of the device. Alternatively, the method can include comparing the power command (e.g., ON or OFF) transmitted to a device to the previously stored power status of the device to determine if the device was not properly controlled (e.g., the power command transmitted as ON compared to a previously stored power status of ON).

As an illustrative example, if the previously stored status of Device 1 is ON and a power ON code was transmitted to Device 1, the control unit can determine that there may be an issue with the configuration between the universal remote control 102 and Device 1 (e.g., Device 1 was not previously properly controlled). Accordingly, the universal remote control 102 can prompt the user for feedback if an issue is detected and/or maintain an error log (e.g., stored at the database 118) based on transmitting the power ON and power OFF codes and a previously stored status of the device.

The embodiments discussed herein may also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media may include volatile and nonvolatile, removable and non-removable media implemented in any method or technology for storage of information such as computer readable instructions, data structures, modules or other data. Non-transitory computer readable storage media excludes transitory and propagated data signals.

A universal remote control device and user interface for discrete control of multiple devices have been described above with particularity. Modifications and alterations will occur to those upon reading and understanding the preceding detailed description. The invention, however, is not limited to only the embodiments described above. Instead, the invention is broadly defined by the appended claims and the equivalents thereof. It will be appreciated that various embodiments of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for controlling multiple devices with a universal remote control device, comprising:
   receiving a boot completed notification from a control unit of the universal remote control device;
   displaying a troubleshooting icon on a display of the universal remote control device;
   upon receiving a user input selecting the troubleshooting icon, generating a power user interface menu including identifying devices of the multiple devices controlled by the universal remote control device having discrete power ON and power OFF codes and enabling discrete control of power ON and power OFF for each device of the multiple devices on the power user interface menu; and
   displaying the power user interface menu on at least a portion of the display.

2. The computer-implemented method of claim 1, wherein generating the power user interface menu further includes identifying a list of each device of the multiple devices controlled by the universal remote control device.

3. The computer-implemented method of claim 2, further including generating a power ON icon and a power OFF icon for each identified device, wherein the power ON icon is associated with a power ON code and the power OFF icon is associated with a power OFF code, and wherein each power ON code and power OFF code is specific to each identified device.

4. The computer-implemented method of claim 1 further including generating a power ON icon and a power OFF icon for each of the devices identified as having discrete power ON and power OFF codes on the power user interface menu.

5. The computer-implemented method of claim 4, wherein generating the power ON icon and the power OFF icon for each of the devices identified as having discrete power ON and power OFF codes, further includes associating with the power ON icon and the power OFF icon respective discrete power ON and power OFF codes.

6. The computer-implemented method of claim 1, wherein generating the power user interface menu further includes identifying devices without discrete power ON and power OFF codes.

7. The computer-implemented method of claim 1, further including for each device identified without discrete power ON and power OFF codes, generating a pre-configured wake-up code.

8. The computer-implemented method of claim 7, further including for each device identified without discrete power ON and power OFF codes, generating a wake-up icon and associating respective pre-configured wake-up code with each wake-up icon.

9. The computer-implemented method of claim 4, further including upon receiving a user input selecting one or more power ON and power OFF icons, transmitting the associated power ON and power OFF codes to the respective devices.

10. The computer-implemented method of claim 9, further including determining a power status of the device in response to transmitting the power ON and power OFF codes.

11. A universal remote control device for controlling multiple devices, comprising:
a control unit electrically connected with a power switch, the control unit initiating a boot process and generating a boot completed notification based on actuation of the power switch, the control unit including a processor;
a display electrically connected with the control unit, the display including a touch panel for receiving user input, wherein the control unit displays a troubleshooting icon on the display upon generating the boot completed notification; and
upon receiving a user input on the touch panel selecting the troubleshooting icon, the control unit generates a power user interface menu enabling discrete control of power ON and power OFF for each device controlled by the universal remote control device from the power user interface menu, wherein the control unit identifies each device controlled by the universal remote control device having discrete power ON and power OFF codes and identifies each device controlled by the universal remote control device without discrete power ON and power OFF codes, wherein the control unit displays the power user interface menu on at least a portion of the display.

12. The universal remote control device of claim 11, furthering including an IR signal generator electrically connected to the control unit.

13. The universal remote control device of claim 11, wherein the control unit identifies each device controlled by the universal remote control device with discrete power ON and power OFF codes by accessing a memory operably connected to the control unit, the memory storing function codes associated with each device.

14. The universal remote control device of claim 13, wherein the control unit retrieves power ON and power OFF codes for each identified device from the memory and associates the power ON and power OFF codes with the respective power ON and power OFF icons.

15. The universal remote control device of claim 11, wherein the control unit generates a pre-configured wake-up code for each device identified without discrete power ON and power OFF codes.

16. The universal remote control device of claim 15, wherein the control unit generates a wake-up icon for each multiple connected device identified without discrete power ON and power OFF codes and associates each wake-up icon with the respective pre-configured wake-up code.

17. A non-transitory computer readable medium comprising instructions that when executed by a processor electrically connected to a control unit of a universal remote control device performs a method for controlling a multiple devices, comprising:
receiving a boot completed notification from a control unit of the universal remote control device;
displaying a troubleshooting icon on a display of the universal remote control device;
upon receiving a user input selecting the troubleshooting icon, generating a single power user interface menu enabling discrete control of power ON and power OFF for each device of the multiple devices controlled by the universal remote control device on the single interface power user interface menu, wherein generating further includes identifying devices of the multiple devices controlled by the universal remote control device having discrete power ON and power OFF codes; and
displaying the single power user interface menu on at least a portion of the display.

18. The non-transitory computer readable medium of claim 17, wherein generating the power user interface menu further includes generating discrete power ON and power OFF icons for each device identified as having discrete power ON and power OFF codes and assigning power ON and power OFF codes to each of the icons, wherein the power ON and power OFF codes are retrieved from a memory and are specific to each device.

* * * * *